G. G. F. BOSWELL.
SHOCK ABSORBER.
APPLICATION FILED AUG. 16, 1919.
1,353,514.
Patented Sept. 21, 1920.
3 SHEETS—SHEET 3.
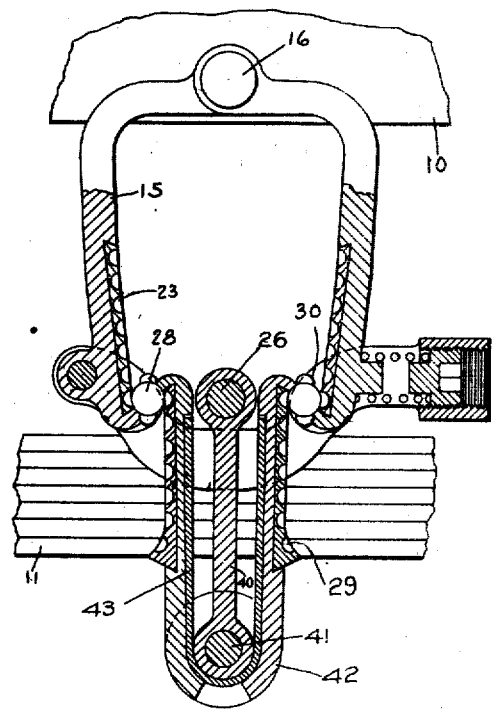
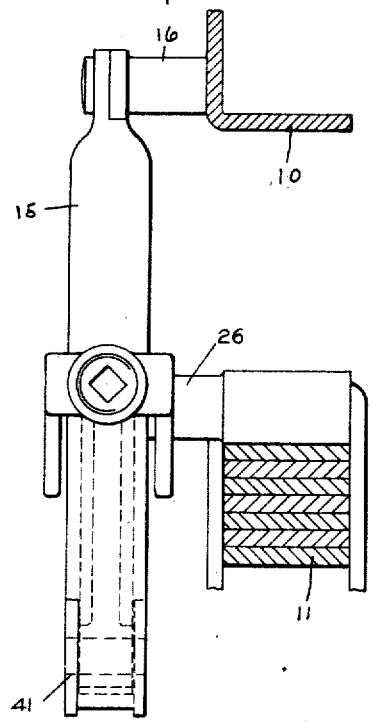
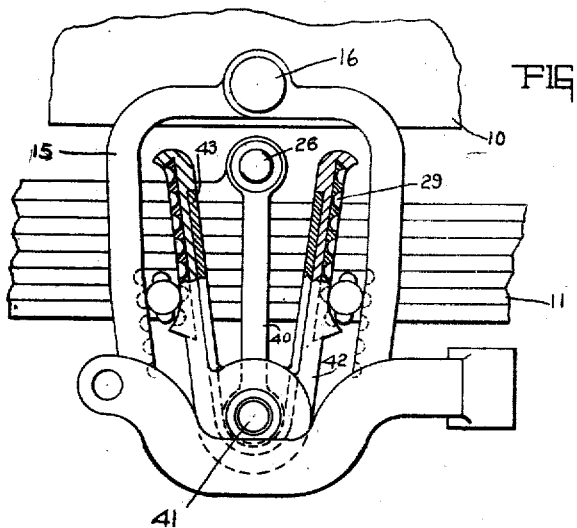
INVENTOR.
GEORGE G. F. BOSWELL.
BY
Lockwood Lockwood
ATTORNEYS.

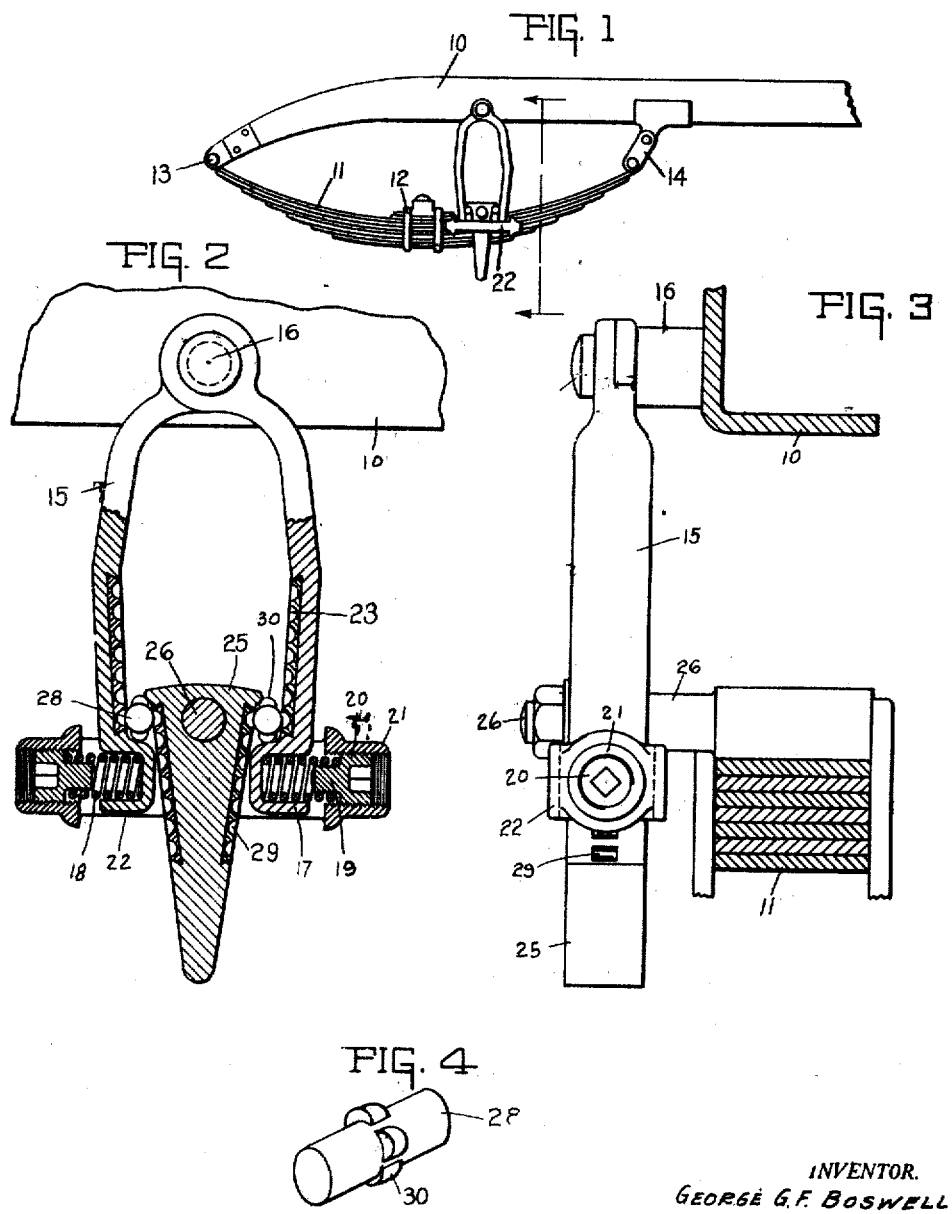

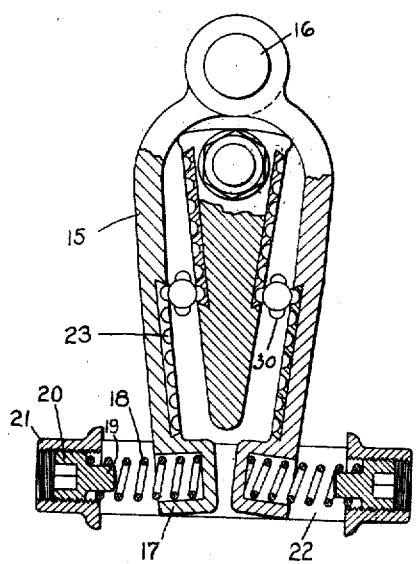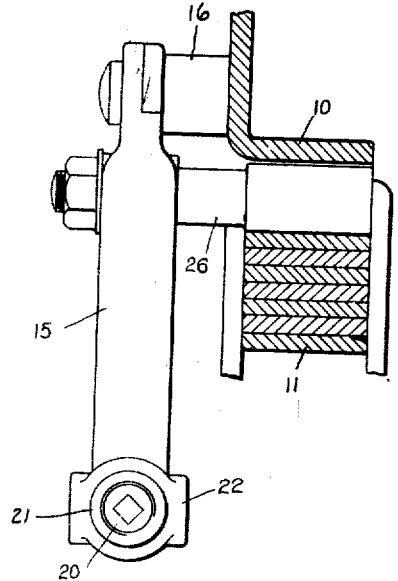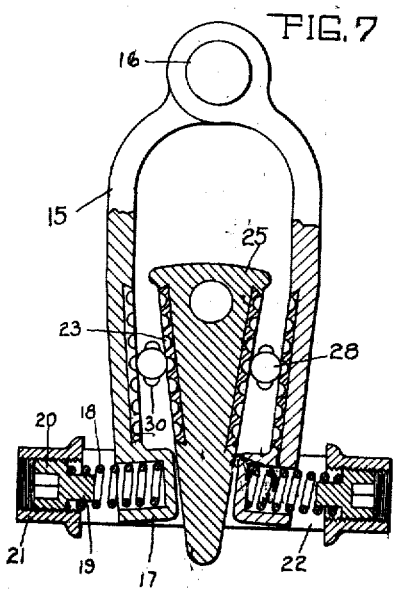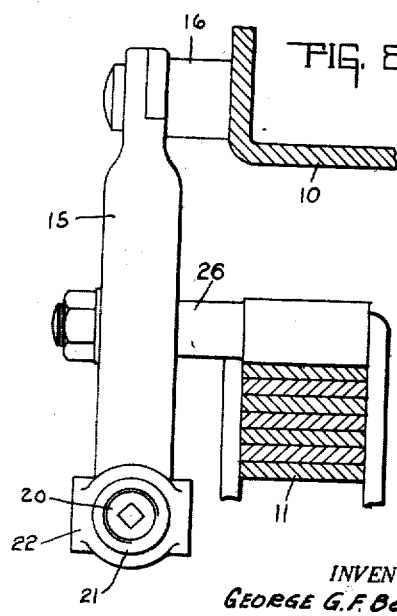

1,353,514.

UNITED STATES PATENT OFFICE.

GEORGE G. F. BOSWELL, OF INDIANAPOLIS, INDIANA.

SHOCK-ABSORBER.

Specification of Letters Patent.  Patented Sept. 21, 1920.

Application filed August 16, 1919.  Serial No. 317,909.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like numerals refer to like parts.

The object of this invention is the provision of a seat of a shock absorber for automobiles having side springs for supporting the chassis.

One feature of this invention consists in two members, one connected with the chassis and the other with the spring, reciprocating longitudinally of each other and frictionally engaging each other, arranged so that the friction of the engagement increases on the occasion of a heavy load or the rebound so as to check the relative movement of the chassis and spring.

Another feature of the invention consists in mounting on the chassis two downwardly extending members pivoted to the chassis with the their lower ends spring-pressed toward each other and mounting a V-shaped member on the spring in position to operate vertically in said upper member and frictionally engaging the sides thereof, so that such friction or resistance would increase when said members moved relative to each other beyond their normal position in either direction.

The general nature of this invention will be understood more fully from the accompanying drawings and the following description and claims.

In the drawings Figure 1 is a side elevation of one side of the chassis and one side of the spring and a shock absorber associated therewith, in the position on rebound. Fig. 2 shows the shock absorber, on a larger scale, partly in elevation and partly in section in the same position as in Fig. 1, parts being broken away. Fig. 3 is a section on the line 3—3 of Fig. 1. Fig. 4 is a perspective view of one of the friction rollers. Fig. 5 is an other view of the shock absorber partly in elevation and partly in section, showing it in its limit of movement under a heavy load. Fig. 6 is the same as Fig. 3 showing the parts in position under a very heavy load. Fig. 7 is the same as Fig. 5 showing the parts of the shock absorber in a normal position. Fig. 8 is the same as Fig. 6 with the parts in their normal position. Fig. 9 is a view partly in elevation and partly in section of a modified form of shock absorber and the parts with which it is mounted, said parts being partially broken away and the shock absorber being in position at its extreme rebound limit of movement. Fig. 10 is a view like Fig. 8 of what is shown in Fig. 9. Fig. 11 is the same as Fig. 9 with the parts in position under a heavy load.

Most of the motor vehicles, excepting the Ford automobiles, are provided with a chassis frame having a side bar 10 and a side spring 11 semi-elliptical centrally supported on an axle, not shown by the clamp 12. The spring 11 is pivoted at one end by pins 13 to the downwardly turned end of the chassis bar. The other end of the spring 11 is connected by shackles 14 with the chassis bar.

In the operation of automobiles equipped as above described, the springs are usually too stiff to take up all the vibrations of the axle resulting from rough roads and a still greater trouble is the shock of the rebound movement of the chassis frame.

The shock absorber herein shown is designed to accomplish both the above objects but particularly to check the rebound movement of the chassis frame.

The shock absorber consists of two members 15 pivoted to the chassis 10 by the pins 16 and the two members 15 extending downwardly almost parallel with each other jaw-like so that the lower free ends are movable toward and from each other. The lower ends of the members 15 have barrels 17 for receiving the inner ends of the spiral springs 18 and the other ends of said springs are mounted on the pins 19 extending inward from the nuts 20 which screw into the heads 21 of the bar 22 that extends transversely of the jaw-like members 15. By this means, as shown in Fig. 6, the lower ends of the members 15 are forced toward each other. The inner surfaces of the lower part of the two members 15 are provided with a series of notches or recesses 23, as shown.

A V-shaped member 25 of the shock absorber is secured at its upper and larger end on the rod or arm 26 which is secured upon and extends laterally from the spring 11 so as to be held in rigid position. The wedge member 25 is adapted to move vertically between the lower ends of the members 15 as the upper and lower members are moved by the spring and chassis in their relative movement toward and from each other, but such movement is resisted frictionally by the wedge shape of the member 25, the springs 18 and the friction caused by friction rollers 28 engaging the members 15 and 25. Each side of the wedge member 25 has a series of notches or recesses 29 corresponding to the notches 23 and the rollers 28 have radial projections 30 which extend and fit into the notches 23 and 29.

When the automobile is unloaded the parts of the shock absorber are in a position, as shown in Fig. 7, which may be called a normal position. There the friction rollers 28 are in an intermediate position half way between the ends of the series of notches 23 and 29. As the load increases the upper members 15 of the shock absorber are forced downward with relation to the wedge member 25, from the position shown in Fig. 7 toward the position shown in Fig. 5. Or when the wheels run over an elevation in the road, the wedge member 25 suddenly rises from the position shown in Fig. 7 toward the position shown in Fig. 5. The overcoming movements are resisted by the friction rollers 28, as they frictionally engage the two notched members 15 and 25. They are held in frictional engagement by the springs 18, which force the members 15 tightly against the friction rollers. Since the friction rollers cannot act and travel suddenly, the slowness of their movement tends to resist any change in their relative positions of the upper and lower members of the shock absorber and thus the downward movement of the members 15 under load, or the upward movement of the member 25 when the car runs over an elevation in the roadway is yieldingly resisted.

On the occasion of a rebound the tendency of the upper members 15 is to rise above their upper limit of movement which is shown in Figs. 1, 2 and 3. This movement is resisted, however, strongly, not only by the friction rollers 28, but by the wedge shape of the member 25 and the resistance of the springs 18 to compression. For in the rebound movement, the parts are changed from the position shown in Fig. 7 to the position shown in Figs. 1, 2 and 3. These various features of resistance will practically prevent the members of the shock absorber being moved to their limit of movement shown in Fig. 1 and will check the rebound movement so that it will not be uncomfortable.

A modified form of the invention is shown in Figs. 9 to 11. There instead of the V-shaped member 25, the lower member consists of a central bar 40 which is pivoted at its upper end to the rod 26 and at its lower end it is pivoted by pins 41 to the lower ends of the bars 42. There is one of these bars on each side of the bar 40. These bars 42 are provided with the series of notches 29. The upper ends of the bars 42 bear against the friction rollers 30 and are forced against them by a U-shaped spring 43 embedded in a seat in the inner surfaces of the bars 42.

The operation of this modified form is exactly the same as the other form shown in Figs. 1 to 8. The spring 43 is under such tension as to tend to force the upper ends of the bars 42 outward away from each other, as shown in Fig. 11 and thus tend to resist a change of movement from the position shown in Fig. 1 toward the position shown in Fig. 9.

The invention is not limited to the specific construction herein shown for illustrating its general nature. The chief and particular idea of the invention is the mounting of an upper member on a chassis frame and the lower member on a spring which reciprocate with each other, and such reciprocation is resisted by the friction under spring means substantially as set forth.

The invention claimed is:

1. The combination with part of a frame of an automobile, and a spring for supporting the same of a shock absorber having an upper member mounted on the frame of the automobile and the lower member secured to the spring, said two shock absorber members being arranged so as to reciprocate with relation to each other, the adjacent faces of said upper and lower shock absorber members being provided with a series of notches, and friction rollers operating between said members and having radial projections for engaging said notches.

2. The combination with part of a frame of an automobile, and a spring for supporting the same of a shock absorber having an upper member mounted on the frame of the automobile and the lower member secured to the spring, said two shock absorber members being arranged so as to reciprocate with relation to each other, the adjacent faces of said upper and lower shock absorber members being provided with a series of notches, and friction rollers operating between said members and having radial projections for engaging said notches, one of said shock absorber members having its notched sides inclined relatively to the notched sides of the other shock absorber member.

3. The combination with part of a frame of an automobile, and a spring for supporting the same of a shock absorber having a pair of bar-like members on the frame portion and extending downward substantially parallel with each other, another shock absorber member secured to the spring and wedge-shaped with its wide end upward and adapted to reciprocate between the two upper members of the shock absorber, adjacent surfaces of said shock absorber members having series of notches therein, and friction rollers mounted between and in engagement with the adjacent surfaces of said members with radial extending projections for fitting into said notches.

4. The combination with part of a frame of an automobile, and a spring for supporting the same of a shock absorber having a pair of bar-like members pivoted together on the frame portion and extending downward substantially parallel with each other, another shock absorber member secured to the spring and wedge-shaped with its wide end upward and adapted to reciprocate between the two upper members of the shock absorber, adjacent surfaces of said shock absorber members having a series of notches therein, friction rollers mounted between and in engagement with the adjacent surfaces of said members with radial extending projections for fitting into said notches, and springs for forcing the lower ends of said upper shock absorber members toward each other.

5. The combination with part of a frame of an automobile, and a spring for supporting the same of a shock absorber having a pair of bar-like members pivoted together on the frame portion and extending downward substantially parallel with each other, another shock absorber member secured to the spring and wedge-shaped with its wide end upward and adapted to reciprocate between the two upper members of the shock absorber, a bar extending transversely of the lower ends of the upper shock absorber members and having offset heads internally threaded, ends in said heads with inwardly projecting pins, and spiral springs on said pins, and the other ends of said springs engaging and bearing against the lower ends of the other shock absorber members, substantially as set forth.

In witness whereof, I have hereunto affixed my signature.

GEORGE G. F. BOSWELL.